United States Patent
Colby

(10) Patent No.: US 7,034,836 B2
(45) Date of Patent: Apr. 25, 2006

(54) ADAPTIVE CACHING OF ANIMATION CONTROLS

(75) Inventor: Christopher Colby, Piedmont, CA (US)

(73) Assignee: Pixar, Emeryville, CA (US)

( * ) Notice: Subject to any disclaimer, the term of this patent is extended or adjusted under 35 U.S.C. 154(b) by 143 days.

(21) Appl. No.: 10/843,147

(22) Filed: May 10, 2004

(65) Prior Publication Data
US 2004/0227762 A1 Nov. 18, 2004

Related U.S. Application Data

(60) Provisional application No. 60/470,716, filed on May 14, 2003.

(51) Int. Cl.
*G06T 15/70* (2006.01)
(52) U.S. Cl. ..................... 345/473
(58) Field of Classification Search ............ None
See application file for complete search history.

(56) References Cited

U.S. PATENT DOCUMENTS

| | | | | |
|---|---|---|---|---|
| 5,416,899 A * | 5/1995 | Poggio et al. ............ 345/475 |
| 5,835,693 A * | 11/1998 | Lynch et al. ............. 345/473 |
| 5,854,634 A * | 12/1998 | Kroitor ..................... 345/473 |
| 5,883,638 A * | 3/1999 | Rouet et al. .............. 345/473 |
| 6,057,859 A * | 5/2000 | Handelman et al. ...... 345/474 |
| 2003/0179203 A1 * | 9/2003 | Bruderlin et al. ......... 345/473 |
| 2004/0227762 A1 * | 11/2004 | Colby ....................... 345/473 |

* cited by examiner

*Primary Examiner*—Kee M. Tung
*Assistant Examiner*—Peter-Anthony Pappas
(74) *Attorney, Agent, or Firm*—Townsend and Townsend and Crew LLP

(57) ABSTRACT

The determination of the final posed position is optimized by tracking the changes in animation variables associated with the sequence of deformers over two or more poses. The earliest deformer of the sequence affected by a changed animation variable is designated the cached deformer, and the input to this deformer is stored for future use. For a subsequent pose, the animation variables changed from the previous pose are identified, and the earliest deformer of the sequence affected by these changed animation variables is compared with the cached deformer. If the earliest deformer affected is the cached deformer or is to be processed after the cached deformer, the final posed position of the control point can be determined from the stored intermediate value of the control point, rather than from the initial position of the control point.

16 Claims, 8 Drawing Sheets

ADAPTIVE CACHING OF ANIMATION CONTROLS

CROSS-REFERENCES TO RELATED APPLICATIONS

This application claims priority to and incorporates by reference for all purposes U.S. Provisional Patent Application "Adaptive Caching of Animation Controls," Ser. No. 60/470,716, filed May 14, 2003.

BACKGROUND OF THE INVENTION

The present invention relates to the field of computer graphics, and in particular to methods and apparatus for animating computer generated characters. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, a character's appearance is defined by a three-dimensional computer model. To appear realistic, the computer model of a character is often extremely complex, having millions of surfaces and tens of thousands of attributes. Due to the complexity involved with animating such complex models, animation tools often rely on animation variables to define the character's animation.

Animation variables, which are sometimes referred to as avars, are parameters used by functions to modify the pose or bodily position of a character model. Animation variables and their associated functions are used to abstract complicated modifications to a character model to a relatively simple control. For example, animation variables can specify the rotation angles of the joints of a character model, thereby positioning the character model's limbs and appendages. More complicated animation variables can define the degree of opening of a character's mouth. In this example, the value of the animation variable is used to determine the position of the many different parts of the character model needed to open the characters mouth to the desired degree. The animation tools then modify the character model according to the final posed armature to create a character model with an open mouth.

Animation variables modify the character model by moving the character model's control points, which are points used to define the surface of the character model. A typical character model can have millions of control points. A series of deformers sequentially move each control point from an initial position through a series of intermediate positions to a final posed position. Each deformer is controlled by the value of at least one animation variable. Starting with the initial position of a control point, a first deformer outputs an intermediate position of the control point. The output of the first deformer is then input into a subsequent deformer, which in turn outputs a subsequent intermediate position. This is repeated for additional deformers associated with the control point, until a final control point position is determined. Typically, each control point is processed by hundreds different deformers to reach its final posed position. Thus, posing a character model with thousands of control points may require executing tens of thousands of different deformers.

To create artistically effective character animation, an animator often creates a rough version of a scene and then fine-tunes the character animation to create desired drama and expression of the final scene. This is analogous to a movie director rehearsing a scene with actors to capture the perfect mood for a scene. Because the animator is responsible for the expressiveness of the character animation, it is important that animation tools allow the animator to efficiently fine-tune a character animation and to accurately preview the final form of the animation.

Unfortunately, the time required to process a character model's numerous control points and associated deformers hinders the efficient fine-tuning of character animation. As animators adjust animation variables to create or fine tune a character's animation, the animation system must re-compute the character model in a new pose. Often, this is performed by re-computing the final posed position of every control point of a character model.

One prior approach to improving execution performance stores, or caches, the intermediate positions of each control point at each deformer of the character model. As animation variables are changed, some or all of the cached inputs can be reused, thereby bypassing the execution of some deformers. However, this approach requires large amounts of memory to store intermediate control point positions. For example, a character model having M control points each with N deformers will require caching up to M*N number of intermediate values.

It is therefore desirable to optimize the posing of character models to decrease the time required for processing control points. It is further desirable to make the animation system more responsive to animation variable adjustments and to make the computer animation process more efficient. It is further desirable that the optimization consume a minimal amount of additional memory and computing resources.

BRIEF SUMMARY OF THE INVENTION

A sequence of deformers controlled by animation variables sequentially moves a control point of a character model from an initial position through a series of intermediate positions to a final posed position for a given pose. In an embodiment, the determination of the final posed position is optimized by tracking the changes in animation variables associated with the sequence of deformers over two or more poses. The earliest deformer of the sequence affected by a changed animation variable is designated the cached deformer, and the intermediate position of the control point to this deformer is stored for future use. For a subsequent pose, the animation variables changed from the previous pose are identified, and the earliest deformer of the sequence affected by these changed animation variables is compared with the cached deformer. If the earliest deformer affected is the cached deformer or is to be processed after the cached deformer, the final posed position of the control point can be determined from the stored intermediate value of the control point, rather than from the initial position of the control point.

In an embodiment, a method of manipulating a character model into a pose defined by a set of values of a set of animation variables includes identifying a changed portion of the set of animation variables and for each control point the earliest deformer affected by the changed portion of the set of animation variables. The earliest deformer is included in a sequence of deformers associated with a control point. The embodiment compares the earliest deformer with a cached deformer also included in the sequence of deformers associated with the control point. In response to the earliest deformer not preceding the cached deformer in the sequence of deformers, the embodiment executes a portion of the sequence of deformers to determine the final position of the control point. The portion of the sequence of deformers begins with the cached deformer and an intermediate position of a control point previously stored in association with the cached deformer.

In a further embodiment of the invention, the set of animation variables includes an output of a deformer associated with a second control point. In another embodiment, the cached deformer is also included in a sequence of deformers associated with a second control point. In still another embodiment, the intermediate position of a control point previously stored in association with the cached deformer is determined from previous pose of the character model. In yet a further embodiment, the previous pose of the character model is from a previous frame of an animation. Alternately, the previous pose of the character model is specified by an animator with an animation software tool.

Still another embodiment repeats the steps of identifying a changed portion, identifying a earliest deformer, comparing the earliest deformer, and executing the sequence of deformers for a second control point and a sequence of deformers associated with the second control point. An additional embodiment repeats the steps of identifying a changed portion, identifying a earliest deformer, comparing the earliest deformer, and executing the sequence of deformers for a second set of values of the set of animation variables defining a second pose of the character model.

BRIEF DESCRIPTION OF THE DRAWINGS

The invention will be described with reference to the drawings, in which.

In the drawings, like reference numbers in different figures correspond with like elements.

DETAILED DESCRIPTION OF THE INVENTION

Figure 1:
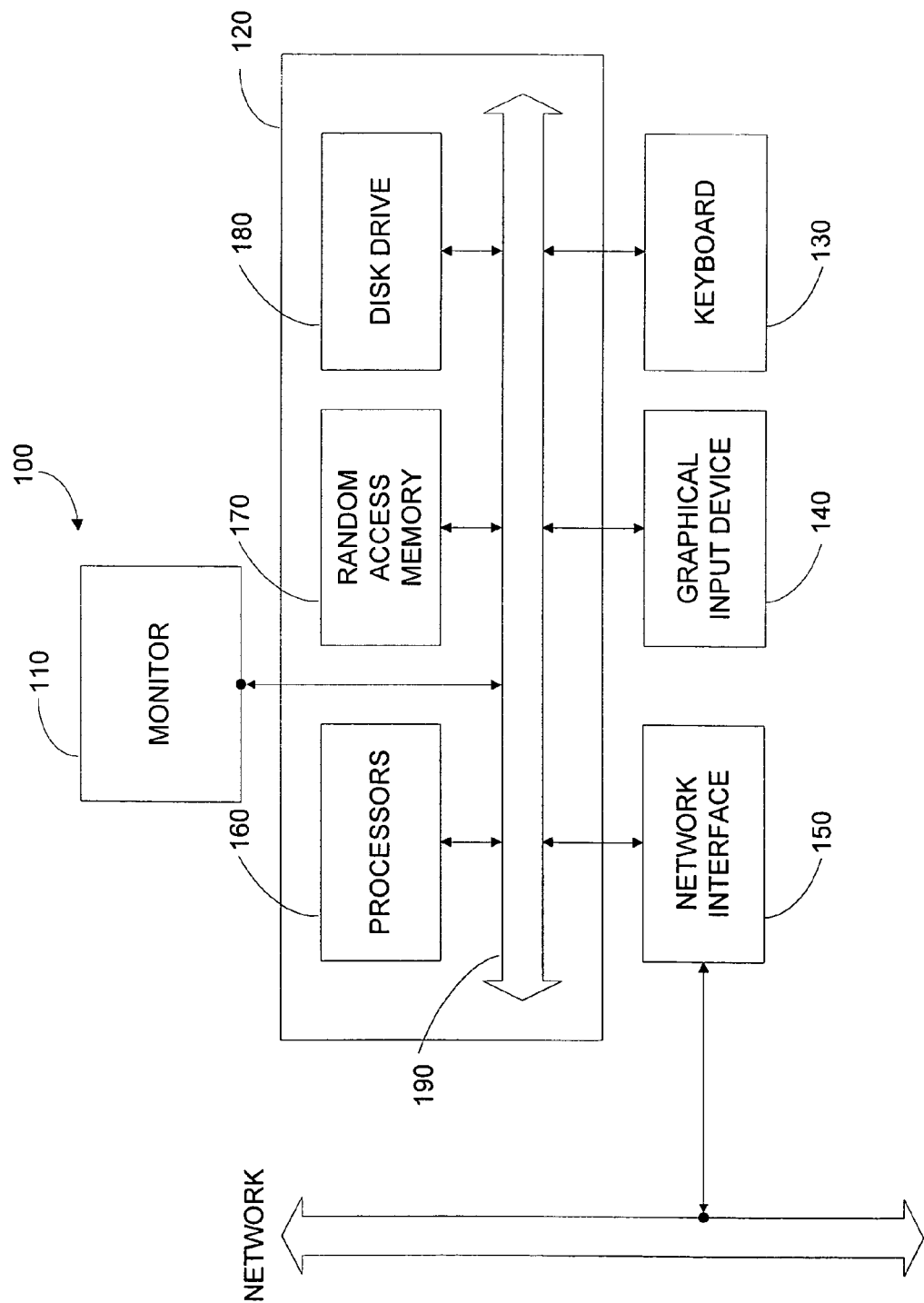
FIG. 1 illustrates a block diagram of a computer system suitable for implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
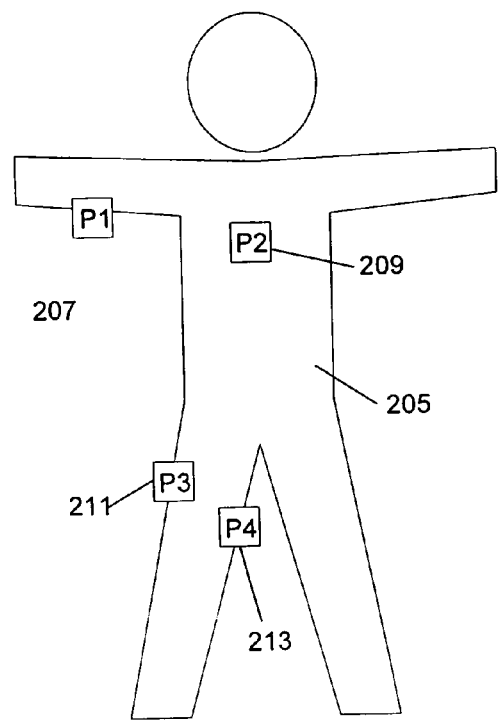
FIGS. 2A–2C illustrates an example manipulation of a set of control points of a character model from an initial position to a final posed position.
Figure 2B:
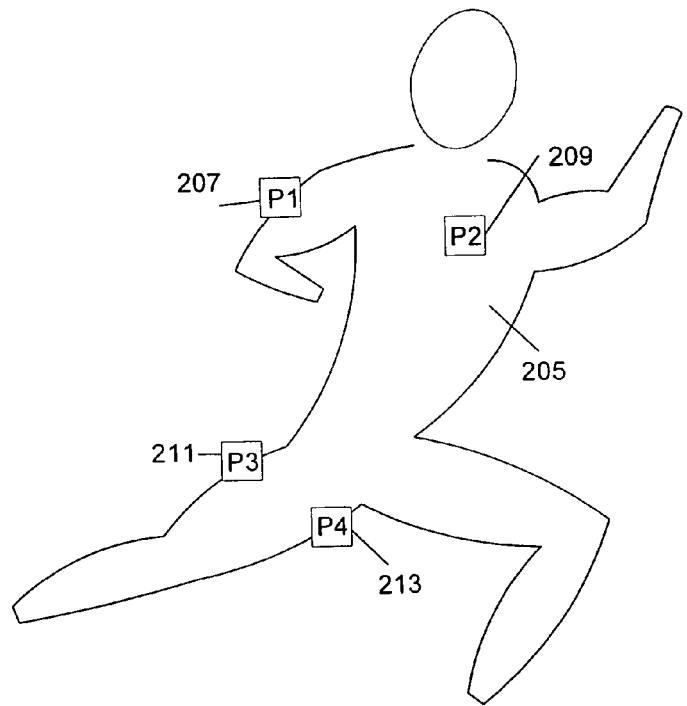
Figure 2C:
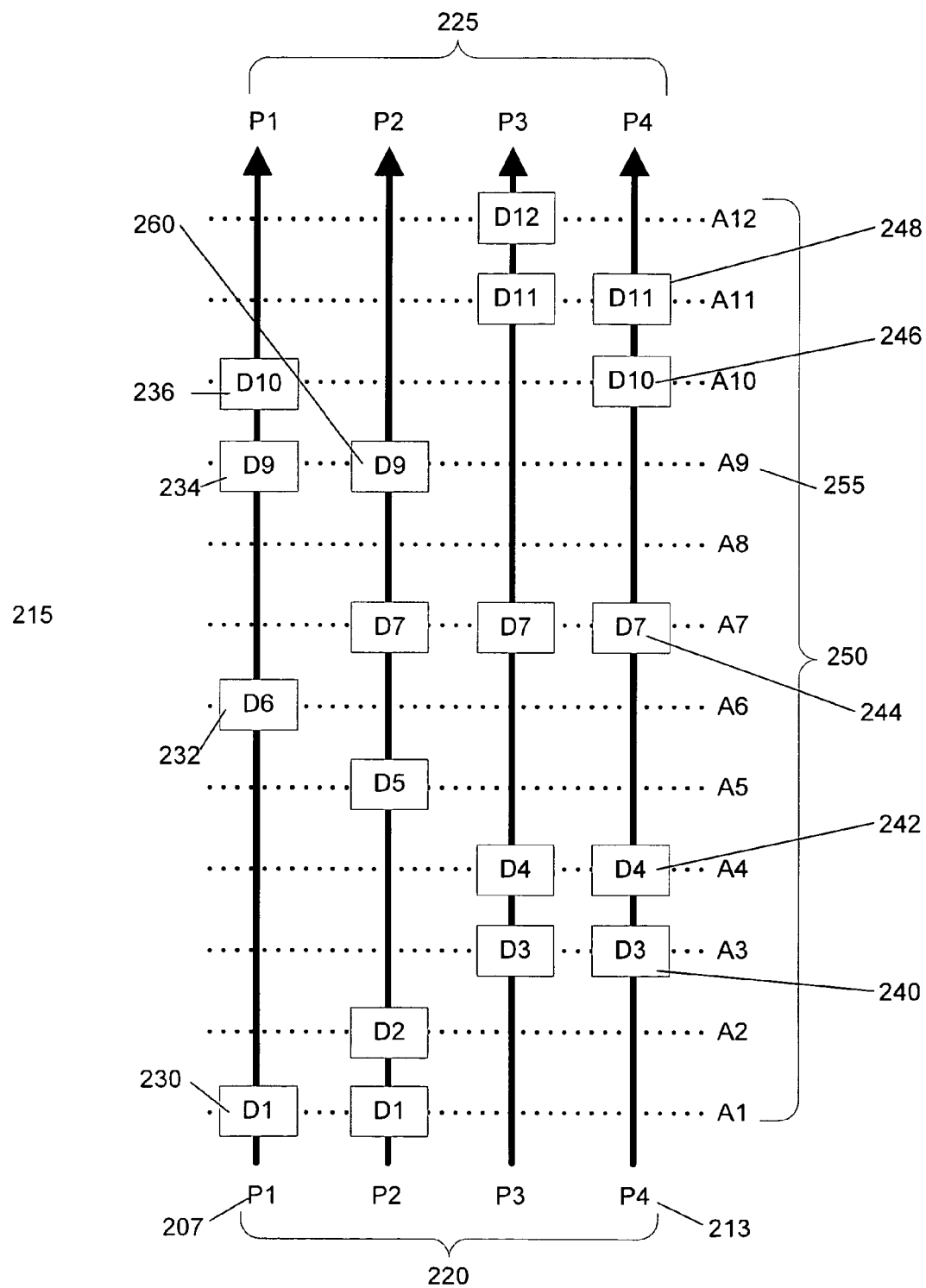

FIGS. 2A–2C illustrates an example manipulation of a set of control points of a character model from an initial position to a final posed position. FIG. 2A illustrates an example character model 205 in an initial, or unposed, position. Character model 205 is a three-dimensional computer model of an object, shown in two dimensions for clarity. Although character model 205 is shown to be humanoid in shape, character model 205 may take the form of any sort of object, including plants, animals, and inanimate objects with realistic and/or anthropomorphic attributes. Character model 205 can be created in any manner used to create three-dimensional computer models, including manual construction within three-dimensional modeling software, procedural object creation, and three-dimensional scanning of physical objects. Character model 205 can be comprised of a set of polygons; voxels; higher-order curved surfaces, such as Bezier surfaces or non-uniform rational B-splines (NURBS); constructive solid geometry; and/or any other technique for representing three-dimensional objects. Additionally, character model 205 can include attributes defining the outward appearance of the object, including color, textures, material properties, transparency, reflectivity, illumination and shading attributes, displacement maps, and bump maps.

In the example of FIG. 2A, the surface of character model is defined by a set of control points, including control points P1, 207; P2, 209; P3, 211; and P4, 213. Control points can be located on or near the surface of the character model 205, such as control points P1, 207; P3, 211; and P4, 213. Control points, such as control point P2, 209, can also be located within the interior of the character model 205. Control points can be used to define the surface of the character model 205 directly or as intermediate values used to determine the positions of additional control points defining the surface of the character model 205.

FIG. 2B illustrates character model 205 in an example posed position. In FIG. 2B, the set of control points defining the surface of the character model 205, including control points P1, 207; P2, 209; P3, 211; and P4, 213, have been moved from their initial, unposed positions to final posed positions, thereby modifying the surface of the character model. Character model 205 is shown with four control points for clarity, and typical character models can include tens of thousands of control points.

FIG. 2C illustrates the system 215 for transforming a set of control points 220 in their initial positions to an output set of control points 225 in the desired final posed positions. The system 215 includes a set of deformers that sequentially operate on the set of control points 220 to create the output set of control points 225. In system 215, all or a portion of the set of deformers can operate on each of the control points.

In FIG. 2C and subsequent figures, the sequence of deformers applied to a control point is represented by a solid arrow, and each deformer in the sequence is represented as a rectangle intersecting the solid arrow. For example, point P1 is processed first by deformer D1, 230, then by deformers D6, 232; D9, 234; and D10, 236. Similarly, control point P4, 213, is processed by deformers D3, 240; D4, 242; D7, 244; D10, 246; and D11, 248.

Starting with the initial position of a control point, the first deformer in a series outputs an intermediate position of the control point. The output of the first deformer is then input into a subsequent deformer, which in turn outputs a subsequent intermediate position. This is repeated for additional deformers in the series associated with the control point, until a final control point position is determined.

Each deformer is controlled by one or more animation variables. In FIG. 2C, the set of animation variables 250 includes animations variables A1 to A12. FIG. 2C includes dotted lines indicating the deformers controlled by each animation variables. For example, animation variable A9, 255, controls deformers 234 and 260. In an embodiment, deformers 234 and 260 are separate instances of the same deformer, each performing the same function. In an alternate embodiment, deformers 234 and 260, though both controlled by the value of animation variable A9, 255, perform different functions.

During fine-tuning of an animated sequence, animators often repeatedly adjust the value of the same animation variable or the values of the same subset of animation variables. Similarly, as an animated sequence is played back, often only the values of a small subset of the animation variables controlling the character model are changed between successive frames. Because of this, an embodiment of the invention can substantially reduce the amount of processing needed to pose a character model without storing every intermediate position value output from the set of deformers.

Figure 3:
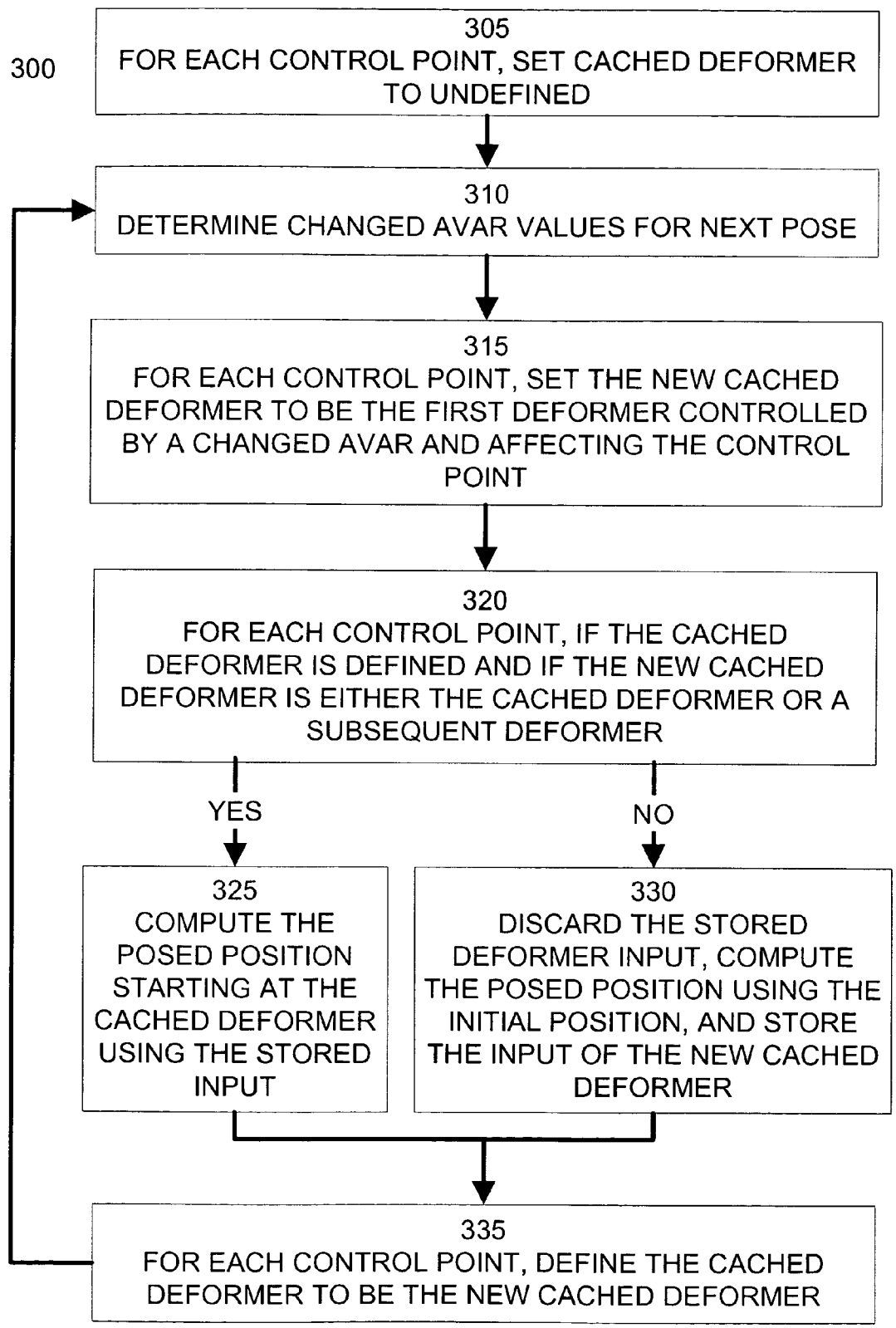
FIG. 3 illustrates a method for optimizing the posing of a character model by decreasing the time required to process control points according to an embodiment of the invention.

FIG. 3 illustrates a method 300 for optimizing the posing of a character model by decreasing the time required to process control points according to an embodiment of the invention. Method 300 can be applied to a single control point or all of the control points of a character model. In response to an animator or an animation software tool specifying a first set of animation variable values defining a first pose for a character model, step 305 sets a cached deformer for the each control point to a null or undefined value. Additionally, step 305 manipulates the character model into the first pose according to the first set of animation values by applying the appropriate sequence of deformers to the control points of the character model.

In response to an animator or an animation software tool specifying a second set of animation variable values defining a second pose, step 310 compares the second set of animation variable values with the first set of animation variable values to determine a subset of animation variables that change between the first and second poses.

For each control point of the character model, step 315 evaluates the sequence of deformers associated with each control point to determine the first deformer in the sequence that is both controlled by one of the subset of changed animation variables determined in step 310 and affects the control point. As discussed in more detail below, the first deformer may be different for the sequences of deformers associated with different control points. Step 315 assigns the first deformer to be the new cached deformer for the control point Following step 315, the character model can be manipulated into the second pose according to the second set of animation values by applying the appropriate sequence of deformers to the control points of the character model. To do so, for each control point, step 320 determines if the cached deformer is defined and, if so, whether the new cached deformer determined in step 315 is the same as the cached deformer or is subsequent to the cached deformer.

If the new cached deformer is the same or subsequent to the cached deformer, then step 325 determines the posed position of the control point using a previously stored input value for the cached deformer to determine the final position of the control point. Rather than starting with the initial position of the control point and executing each of the deformers associated with the control point in sequence, step 325 starts with the previously stored deformer input value and executes the sequence of deformers associated with the control point starting with the cached deformer. By starting with the cached deformer, step 325 is able to determine the final position of the control point while bypassing all of the deformers preceding the cached deformer. As a result, determining the final position of a control point using step 325. typically requires substantially less time and computational resources. Additionally, step 325 stores the input value of the new cached deformer for future use.

Conversely, if the cached deformer is undefined for a control point or if the new cached deformer precedes the cached deformer in a sequence of deformers associated with a control point, then step 330 determines the final posed position of the control point by starting with the initial position of the control point and executing each of the deformers associated with the control point in sequence. Additionally, step 330 discards the input value stored for the cached deformer and stores the input value of the new cached deformer.

Following either step 325 or 330, step 335 defines the cached deformer for a control point as the new cached deformer, and the previously computed input value of the new cached deformer is stored as the input value of the cached deformer. Steps 315–330 are repeated for each control point to determine the final posed position of all of the control points of a character model for a second pose. For subsequent poses, method 300 returns to step 310 to determine the changed animation variable values for the subsequent pose from a previous pose.

Method 300 requires much less memory than prior caching methods while offering similar performance benefits. Method 300 requires, at most, storing one intermediate position for each control point, in contrast with prior caching methods which require storing inputs for each deformer associated with every control point. For cases in which the earliest deformer affected by the subset of changed animation variables is the cached deformer, the execution performance is the same as in prior caching techniques. This case is fairly common as animators fine-tune a character model's pose by repeatedly adjusting the same animation variable or variables.

Figure 4:
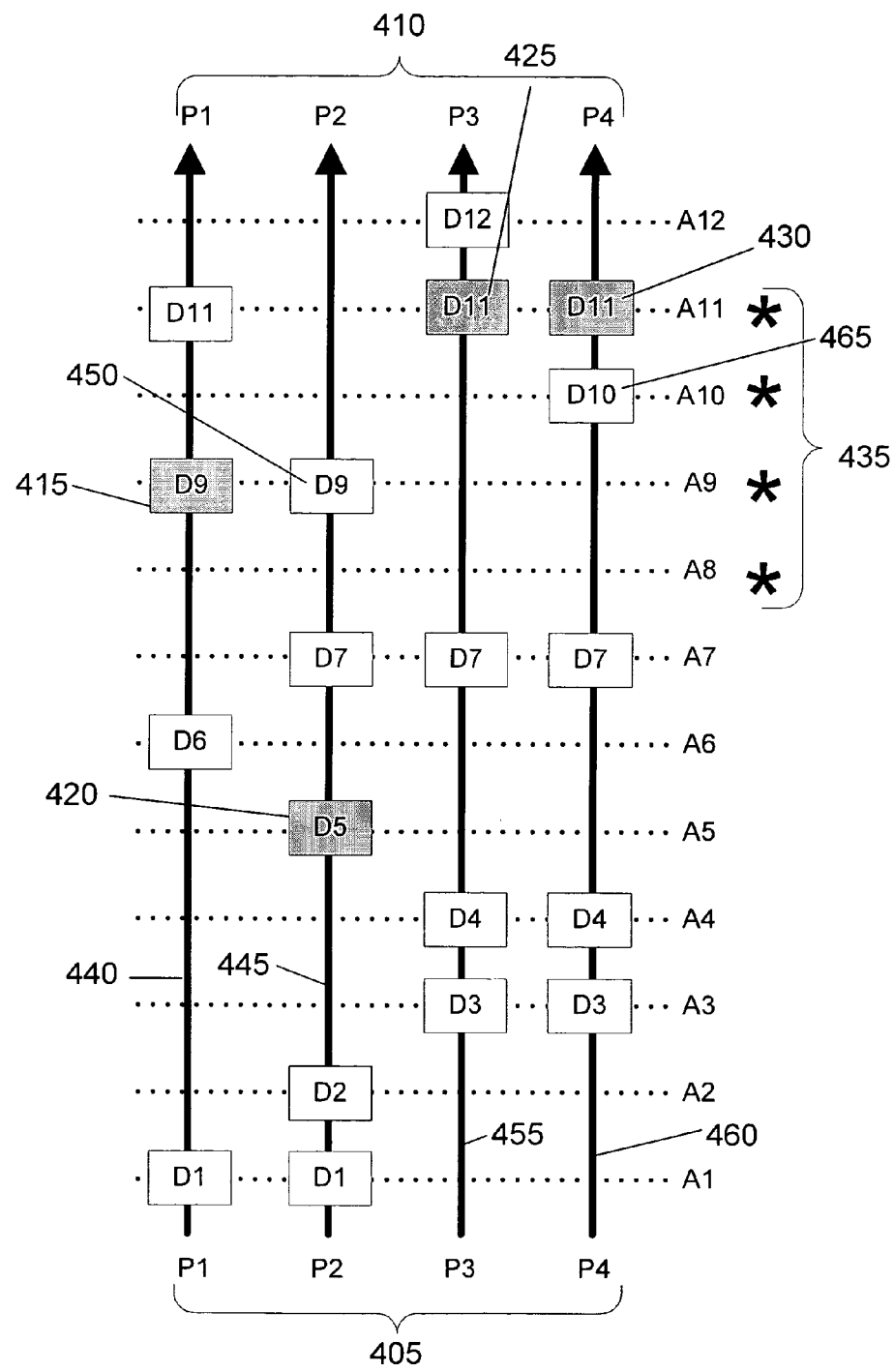
FIG. 4 illustrates an example application of a method for optimizing the posing of a character model by decreasing the time required to process control points according to an embodiment of the invention.

FIG. 4 illustrates an example application of method 300 for optimizing the posing of a character model according to an embodiment of the invention. FIG. 4 illustrates a set of deformers 400 used to process control points from their initial positions 405 to their final positions 410. Following the first iteration of steps 305 to 335 of method 300, one deformer input is stored for each control point. For the example of FIG. 4, the input values of the cached deformers 415, 420, 425, and 430 have been stored during the computation of previous poses. FIG. 4 and subsequent figures illustrate cached deformers, which are deformers that have their input values stored from the computation of previous poses, as shaded rectangles.

Step 325 processes each control point for a third pose. In the example of FIG. 4, a set of animation variables A1–A12 define the third pose. A subset of the animation variables, 435, are changed from their values in a previous pose. In FIG. 4 and subsequent figures, the subset of changed animation variables 435 are indicated by asterisks.

For the sequence of deformers associated with each control points, step 320 determines if the earliest deformer affected by the subset of changed animation variables is the cached deformer or a subsequently processed deformer. For example, in the sequence of deformers 440 associated with the point P1, the earliest deformer affected by the subset of changed animation variables 435 is the cached deformer 415. Because the subset of changed animation variables 435 does not affect any deformers processed before the cached deformer 415, the input value stored for the cached deformer 415 is valid for the third pose. Consequently, step 325 can compute the final position of point P1 by executing the sequence of deformers 440 beginning with cached deformer 415, rather than from its initial position.

Similarly, step 320 evaluates the affect of the subset of changed animation variables 435 on the sequence of deformers 445 associated with point P2. For sequence 445, the earliest deformer affected by the subset of changed animation variables 435 is deformer D9, 450. Because deformer D9, 450, is processed by sequence 445 after the cached deformer 420, the input value stored for the cached deformer 420 is valid for the third pose. Therefore, final position of point P2 for the third pose can be computed by executing the sequence of deformers 445 beginning with the cached deformer 420.

Step 320 evaluates the affect of the subset of changed animation variables 435 on the sequence of deformers 455 associated with point P3. For sequence 455, the earliest deformer affected by the subset of changed animation variables 435 is the cached deformer D11, 425. Because the subset of changed animation variables 435 does not affect any deformers processed before the cached deformer 425, the input value stored for the cached deformer 425 is valid for the third pose and step 325 can compute the final position of point P3 by executing the sequence of deformers 455 beginning with cached deformer 425.

Step 320 evaluates the affect of the subset of changed animation variables 435 on the sequence of deformers 460 associated with point P4. For sequence 460, the earliest deformer affected by the subset of changed animation variables 435 is deformer D10, 465. Because deformer D10, 465, is processed by the sequence of deformers, 460, before the cached deformer, 430, the input value stored for cached deformer, 430, is invalid for the third pose. Therefore, step 330 computes the final position of control point P4 from its initial position.

Figure 5:
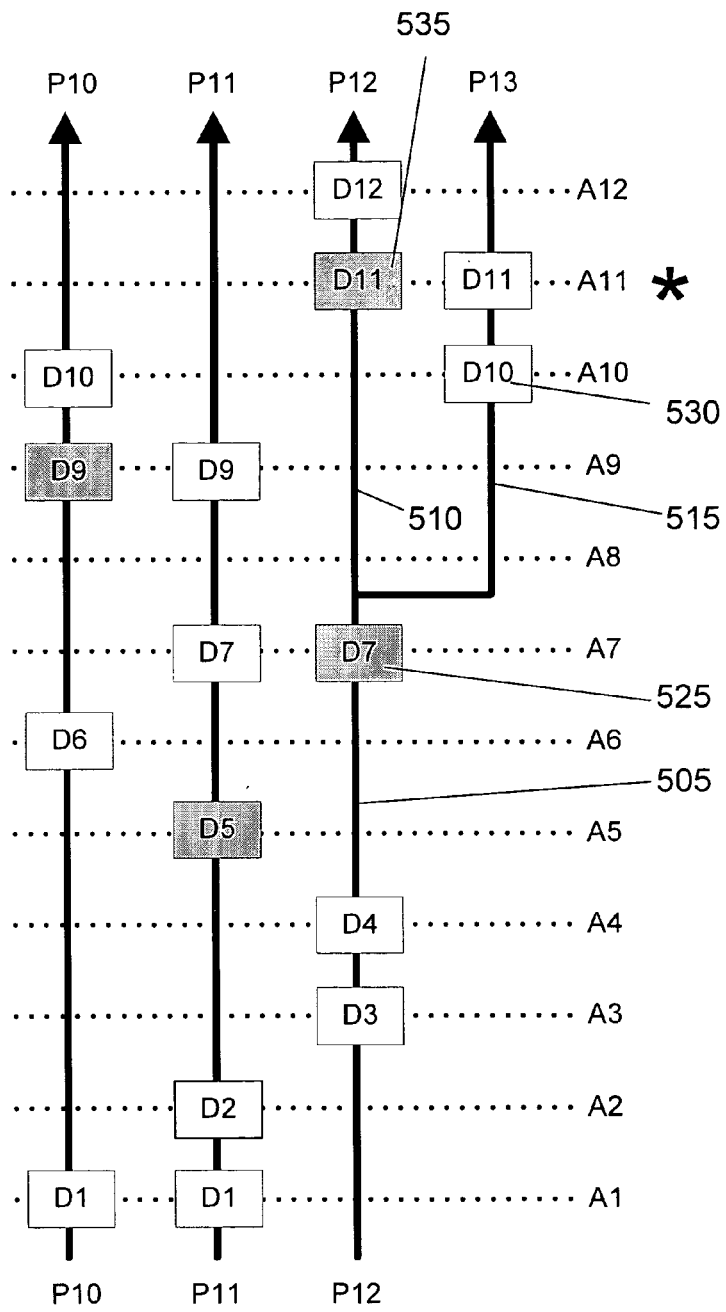
FIGS. 5–7 illustrate further example applications of a method for optimizing the posing of a character model according to an embodiment of the invention.
Figure 6:
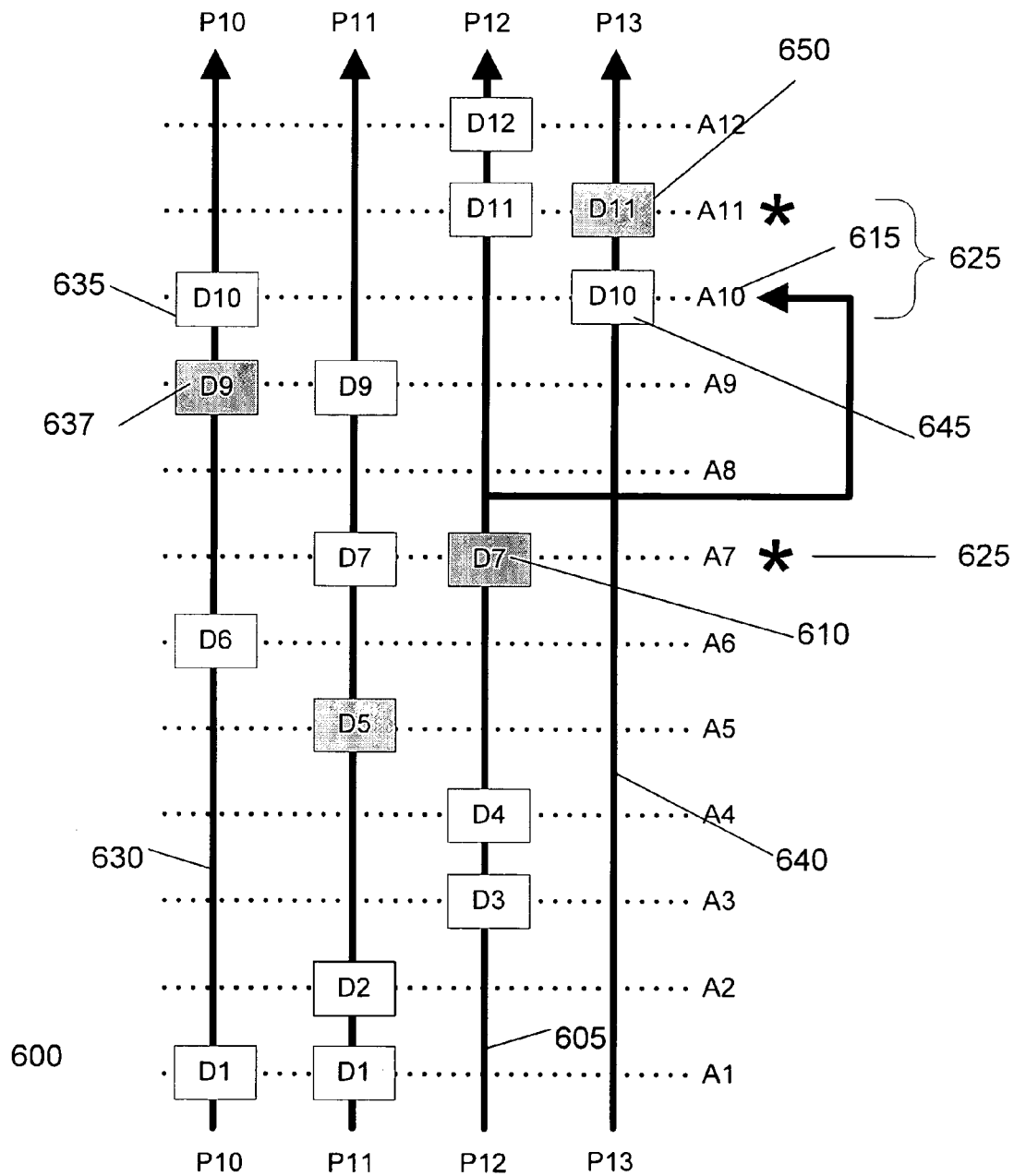
Figure 7:
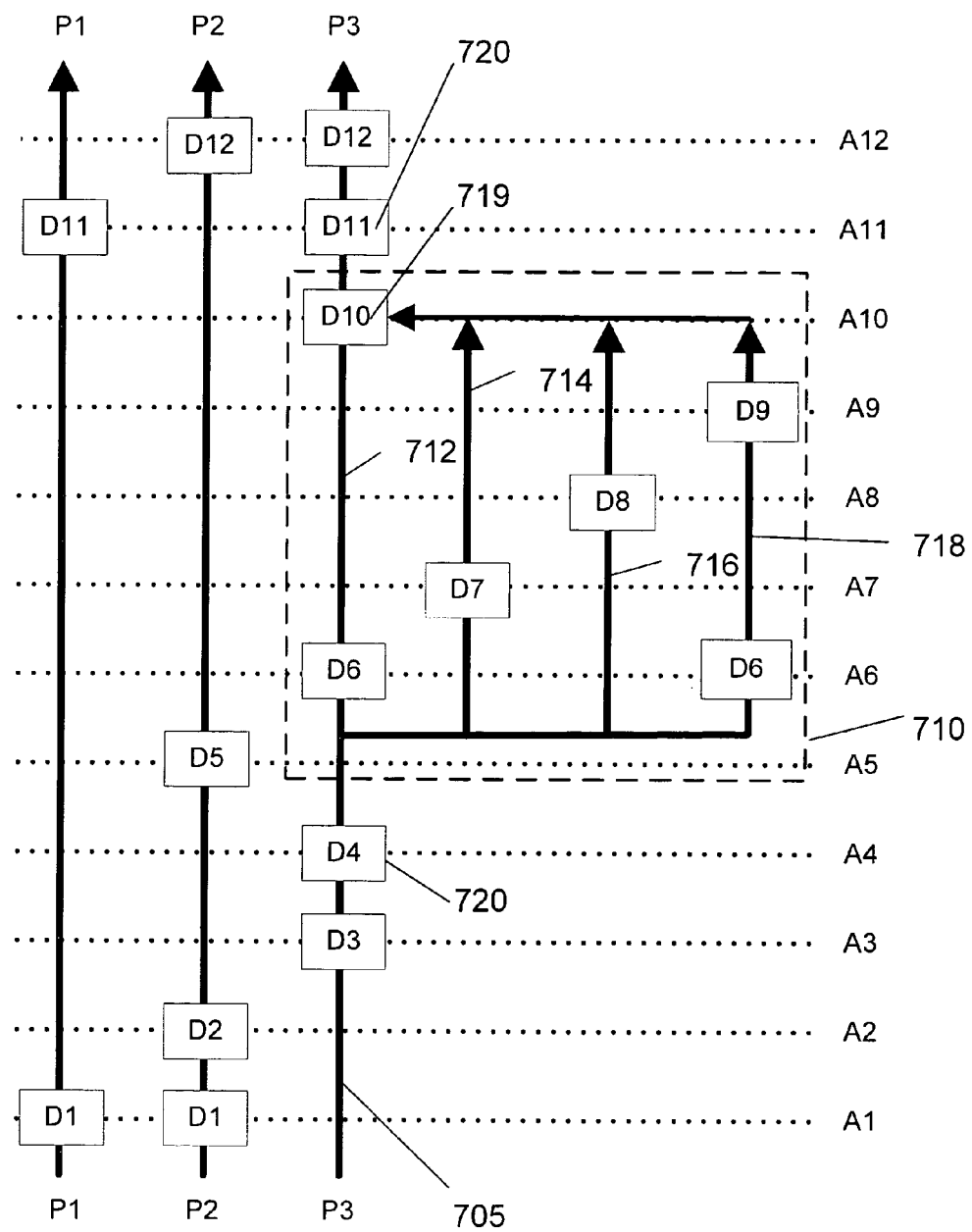

FIGS. 5–7 illustrate further example applications of a method for optimizing the posing of a character model according to an embodiment of the invention. For some sets of deformers, a portion of a sequence of deformers can branch into two or more parts to compute the final positions of two or more points. FIG. 5 illustrates an example of the application of an embodiment of the invention to this type of sequence of deformers. The set of deformers 500 includes a subsequence of deformers 505. Subsequence of deformers 505 splits into sub-sequences 510 and 515 to determine the final positions of control points P12 and P13, respectively. For the example of FIG. 5, the subset of changed animation variables 520 includes animation variables A10 and A11. In processing control point P12, the earliest deformer affected by the subset of changed animation variables 520 is deformer D11, 535. Similarly, the earliest deformer affected by the subset of changed animation variables 520 is deformer D10, 530. In one example, subsequences 510 and 515 can have each have a cached deformer, for example deformer 535 and 530, respectively. Alternatively, either one or both subsequences 510 and 515 can rely on a cached deformer from common subsequence 505, such as deformer 525. In processing each control point, an embodiment of the invention can cache deformers in any subsequence processed to determine the position of the control point for subsequent poses.

Another application of a set of deformers treats the output of a earliest deformer as an animation variable controlling a second deformer. FIG. 6 illustrates an example of the application of an embodiment of the invention to this type of sequence of deformers. In this example, the sequence of deformers 605 includes deformer D7, 610. The output of deformer D7, 610, is used as the value of animation variable A10, 615. Because of this, the subset of changed animation variables 625 includes animation variable A10 in addition to animation variables A7 and A11.

In this example, the sequence of deformers 630 associated with control point P10 includes deformer 635 affected by the subset of changed animation variables 625. Because the cached deformer 637 for this sequence of deformers 630 is processed before deformer 635, the final position of control point P10 can be determined from the input value stored for cached deformer 637, as described above.

For the sequence of deformers 640 associated with control point P13, the earliest deformer affected by the subset of changed animation variables 625 is deformer 645. In this example, because deformer 645 is processed by the sequence of deformers 640 before the cached deformer 650, the input value previously stored for the cached deformer 650 is invalid for the present pose and the final position of control point P13 is computed from the initial position of point P13.

In still another application of a set of deformers, several subsequences of deformers are processed in parallel to determine the final position of a control point. FIG. 7 illustrates an example of the application of an embodiment of the invention to this type of sequence of deformers. The sequence of deformers 705 associated with control point P3 includes a set of subsequences 710. The set of subsequences 710 includes subsequences 712, 714, 716, and 718, each of which may include one or more deformers for processing intermediate positions of control point P3. Conceptually, the set of subsequences 710 are processed in parallel; however, an embodiment of the invention can process any combination of the subsequences serially or in parallel. The results the subsequences 712, 714, 716, and 718 are combined by deformer D10, 719.

To ensure a correct computation of the final position of a control point, an embodiment of the invention can select a cached deformer either before or after the set of sub-deformers. For example, deformer 720 or deformer 725 can be used as a cached deformer. In this embodiment, deformers within a subsequence cannot be selected as the cached deformer. If, for a given pose, a deformer within a subsequence corresponds with the earliest deformer affected by the subset of changed animation variables, an alternate deformer that precedes the earliest deformer affected by the subset of changed animation variables and is not part of a subsequence of deformers is selected as the cached deformer.

It should be noted that once the posed character model has been created using one or more of the above discussed embodiments, any rendering technique, for example ray-tracing or scanline rendering, can create a final image or frame from the model in combination with lighting, shading, texture mapping, and any other image processing information.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

Although the invention has been discussed with respect to specific embodiments thereof, these embodiments are merely illustrative, and not restrictive, of the invention. Thus, the scope of the invention is to be determined solely by the claims.

What is claimed is:

1. A method of manipulating a character model into a pose defined by a set of values of a set of animation variables, the method comprising:
    identifying a changed portion of the set of animation variables;
    identifying an earliest deformer affected by the changed portion of the set of animation variables, wherein the earliest deformer is included in a sequence of deformers associated with a control point;
    comparing the earliest deformer with a cached deformer included in the sequence of deformers associated with the control point; and
    in response to the earliest deformer not preceding the cached deformer in the sequence of deformers, executing a portion of the sequence of deformers to determine the final position of the control point, wherein the portion of the sequence of deformers begins with the cached deformer and an intermediate position of a control point previously stored in association with the cached deformer.

2. The method of claim 1, wherein the set of animation variables includes an output of a deformer associated with a second control point.

3. The method of claim 1, wherein the cached deformer is also included in a sequence of deformers associated with a second control point.

4. The method of claim 1, further comprising repeating the steps identifying a changed portion, identifying a earliest deformer, comparing the earliest deformer, and executing the sequence of deformers for a second control point and a sequence of deformers associated with the second control point.

5. The method of claim 1, further comprising repeating the steps identifying a changed portion, identifying a earliest deformer, comparing the earliest deformer, and executing the sequence of deformers for a second set of values of the set of animation variables defining a second pose of the character model.

6. The method of claim 1, wherein the intermediate position of a control point previously stored in association with the cached deformer is determined from previous pose of the character model.

7. The method of claim 6, wherein the previous pose of the character model is from a previous frame of an animation.

8. The method of claim 6, wherein the previous pose of the character model is specified by an animator with an animation software tool.

9. A computer-readablemedium storing a set of instructions adapted to direct an information processing device to perform an operation manipulating a character model into a pose defined by a set of values of a set of animation variables, the operation comprising the steps of:
    identifying a changed portion of the set of animation variables;
    identifying an earliest deformer affected by the changed portion of the set of animation variables, wherein the earliest deformer is included in a sequence of deformers associated with a control point;
    comparing the earliest deformer with a cached deformer included in the sequence of deformers associated with the control point; and
    in response to the earliest deformer not preceding the cached deformer in the sequence of deformers, executing a portion of the sequence of deformers to determine the final position of the control point, wherein the portion of the sequence of deformers begins with the cached deformer and an intermediate position of a control point previously stored in association with the cached deformer.

10. The information storage medium of claim 9, wherein the set of animation variables includes an output of a deformer associated with a second control point.

11. The information storage medium of claim 9, wherein the cached deformer is also included in a sequence of deformers associated with a second control point.

12. The information storage medium of claim 9, further comprising repeating the steps identifying a changed portion, identifying a earliest deformer, comparing the earliest deformer, and executing the sequence of deformers for a second control point and a sequence of deformers associated with the second control point.

13. The information storage medium of claim 9, further comprising repeating the steps identifying a changed portion, identifying a earliest deformer, comparing the earliest deformer, and executing the sequence of deformers for a second set of values of the set of animation variables defining a second pose of the character model.

14. The information storage medium of claim 9, wherein the intermediate position of a control point previously stored in association with the cached deformer is determined from a previous pose of the character model.

15. The information storage medium of claim 14, wherein the previous pose of the character model is from a previous frame of an animation.

16. The information storage medium of claim 14, wherein the previous pose of the character model is specified by an animator with an animation software tool.

* * * * *